United States Patent [19]

Wang

[11] Patent Number: 5,370,060
[45] Date of Patent: Dec. 6, 1994

[54] MULTIPURPOSE AUTOMOBILE FOLDAWAY TABLE

[76] Inventor: Liwen Y. Wang, 2 Fl., No. 252, Lane 415, Kuang Fu S. Rd., Taipei, Taiwan, Prov. of China

[21] Appl. No.: 74,486

[22] Filed: Jun. 11, 1993

[51] Int. Cl.⁵ .............................................. A47B 23/00
[52] U.S. Cl. ...................................... 108/44; 108/149; 108/25
[58] Field of Search ...................... 108/44, 42, 149, 47, 108/25; 297/146, 147, 163

[56] References Cited

U.S. PATENT DOCUMENTS

| 3,386,392 | 6/1968 | Gramm | 108/44 |
| 4,852,499 | 8/1989 | Ozols | 108/44 |
| 4,872,723 | 10/1989 | Kopf | 108/44 |
| 5,046,433 | 9/1991 | Kramer | 108/44 |
| 5,197,381 | 3/1993 | Mells | 108/44 |
| 5,269,229 | 12/1993 | Akapatangkul | 108/44 |

Primary Examiner—Kenneth J. Dorner
Assistant Examiner—Gerald A. Anderson
Attorney, Agent, or Firm—Bacon & Thomas

[57] ABSTRACT

A multipurpose automobile foldaway table which includes a table pivotably connected to a frame, two retractably bars respectively and retractably fastened to the frame, and lock screws respectively threaded into screw holes on the frame for locking the retractable bars at a desired elevation, each retractable bar having a top end terminated to a swivel hook for mounting on the head rest of a car seat, the table having recessed top compartments covered by a sliding cover for holding things, and collapsible stands at the bottom for supporting the foldaway table on the ground as it is dismantled from the car seat.

6 Claims, 8 Drawing Sheets

MULTIPURPOSE AUTOMOBILE FOLDAWAY TABLE

BACKGROUND OF THE INVENTION

The present invention relates to a multipurpose automobile foldaway table which can be conveniently adjusted to the desired elevation when installed in a car seat, and which can also be used as an outdoor chair.

A foldaway table may be mounted on the back rest of a car seat for having meals on. FIG. 1 illustrates a foldaway table according to the prior art which is generally comprised of a flat base plate, a mount for mounting the flat base plate on the supports of the head rest of a car seat, and a flat cover plate hinged to the flat base plate. This structure of foldaway table can not be adjusted vertically according to the height of the user when installed, one may feel uncomfortable while having a meal on the foldaway table. Because the flat base plate is provided for carrying things, the things being carried on the flat base plat may slip from the flat base plate as the car is moving over a rugged area. Another disadvantage of this structure of foldaway table is its complicated mounting and dismounting procedures. Still another disadvantage of this structure of foldaway table is its limited application. This structure of foldaway table can only be mounted on the supports of the head rest and disposed at the back of the car seat. Furthermore, the hinged flat cover plate may suddenly snap down, as the foldaway table is shaken by the car, to cause an accident.

SUMMARY OF THE INVENTION

The present invention eliminates the aforesaid disadvantages. It is an object of the present invention to provide a foldaway table which can be conveniently and detachably fastened to the head rest of a car seat. It is another object of the present invention to provide a foldaway table which can be conveniently adjusted to the desired elevation after it has been fastened to the head rest of a car seat. It is still another object of the present invention to provide a foldaway table which has means to retain the things being placed thereon. It is still another object of the present invention to provide a foldaway table which can be used as a picnic table or an outdoor chair when it is dismantled from the car seat. According to one embodiment of the present invention, the foldaway table is comprised of a table, two tubes bilaterally and pivotably connected to the table at one end, and retractable bars retractably fastened to the tubes by lock screws. By means of the control of the lock screws, the retractable bars can be moved relative to the tubes so as to adjust the elevation of the table. The table has collapsible stands for supporting the foldaway table on the ground as the foldaway table is used as a picnic table or an outdoor chair. The table has recessed compartments for keeping things, and retractable cut holders for carrying canned beverage, etc.

BRIEF DESCRIPTION OF THE DRAWINGS

FIG. 8 is a perspective view of an alternate form of the

DETAILED DESCRIPTION OF THE PREFERRED EMBODIMENT

Figure 1:
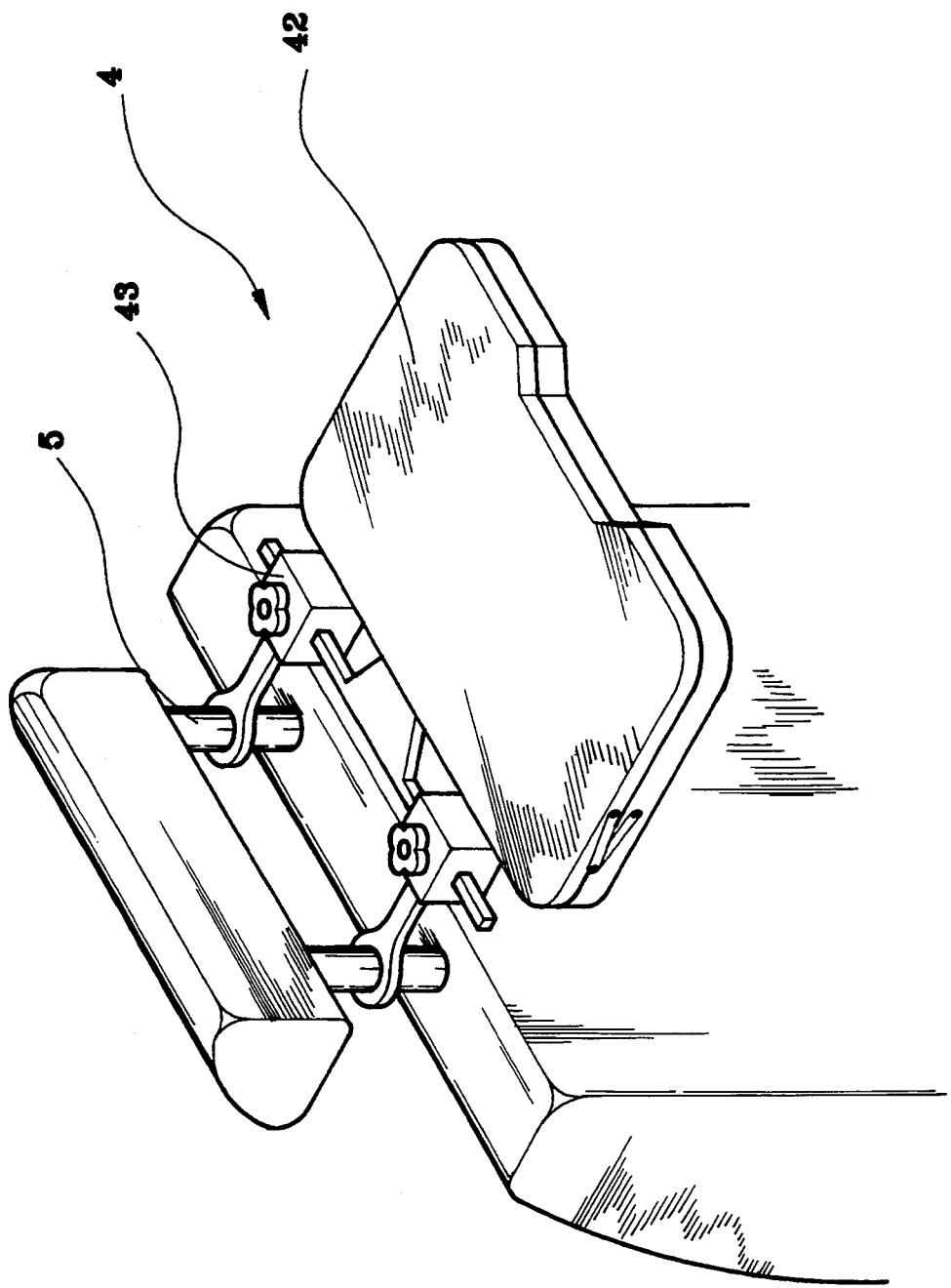
FIG. 1 is a perspective installed view of a foldaway table according to the prior art.
Figure 2:
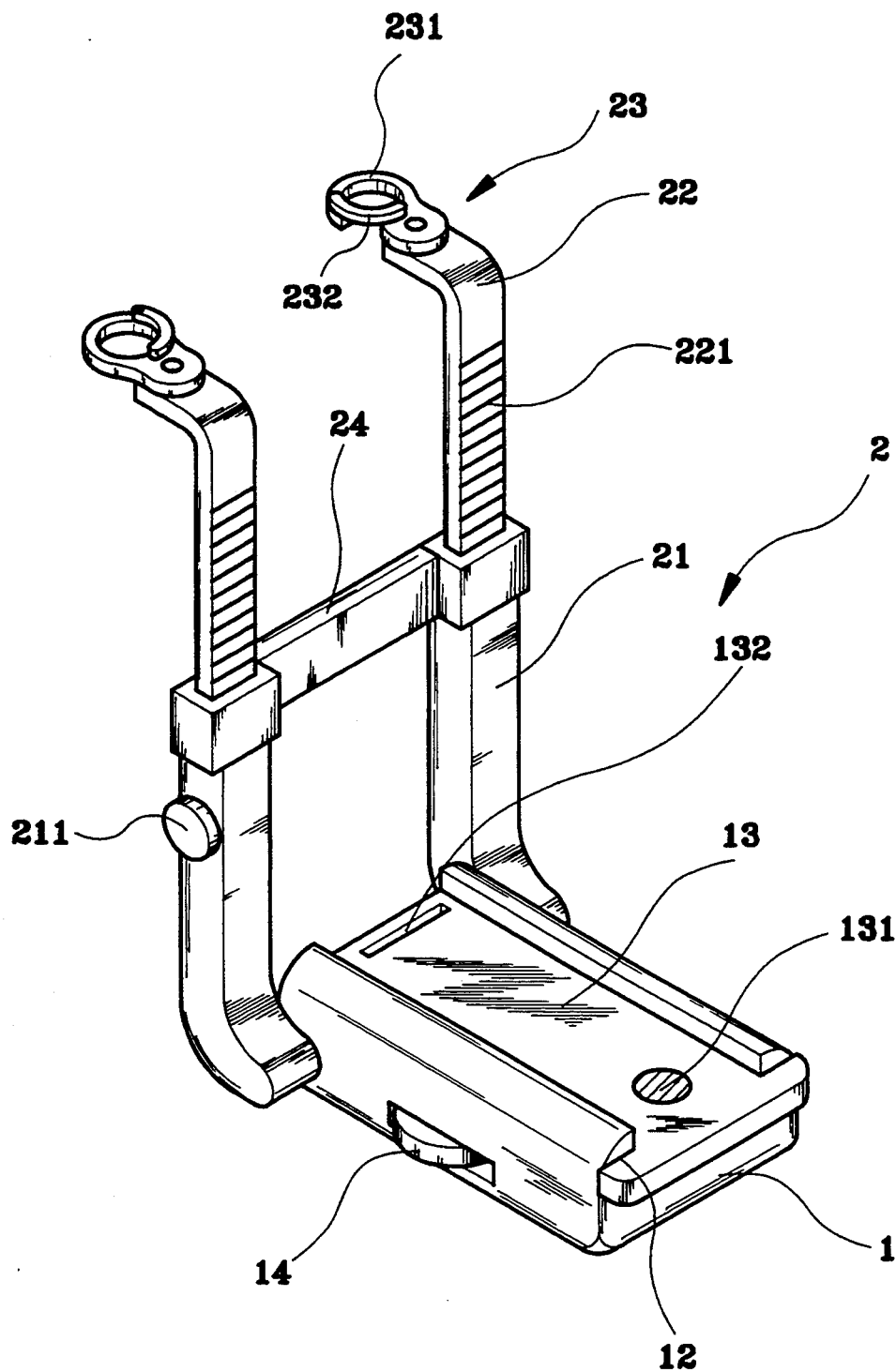
FIG. 2 is a perspective view of a foldaway table according to the preferred embodiment of the present invention.

Referring to FIG. 2, a foldaway table in accordance with the present invention is generally comprised of a table 1 for carrying things, and a retractable mounting device 2 for mounting the table 1 on a car seat and for adjusting the elevation of the table 1 relative to the car seat.

The table 1 comprises a plurality of recessed compartments 11 at the top for holding things (see FIG. 5), two parallel sliding grooves 12 in which a sliding cover 13 slides above the recessed compartments 11, two retractable cup holders 14 on two opposite sides thereof for carrying canned beverage, etc., and collapsible legs 25 at the bottom. The sliding cover 13 has an embossed portion 131 for moving with the fingers, and a recessed storage chamber 132 for holding writing materials. As the sliding cover 13 is closed, the table 1 can be served as a desk for writing, reading, or doing business.

The retractable mounting device 2 comprises two tubes 21 bilaterally pivoted to the table 1 at one end and joined by a horizontal link 24, two retractable bars 22 respectively inserted in the tubes 21, each retractable bar 22 having transverse grooves 211 vertically spaced along the length, two lock screws 211 respectively threaded into a respective hole (not shown) on either tube 21 and engaged into either transverse groove 211 on the respective retractable bar 22 to lock the retractable bars 22 in the tubes 21 respectively, and two swivel hooks 23 respectively fastened to the retractable bars 22 for mounting on the supports of the head rest of a car seat. The swivel hook 23 comprises a hook body 231 revolvably fastened to either retractable bar 22 at one end, and a latch 232.

Figure 3:
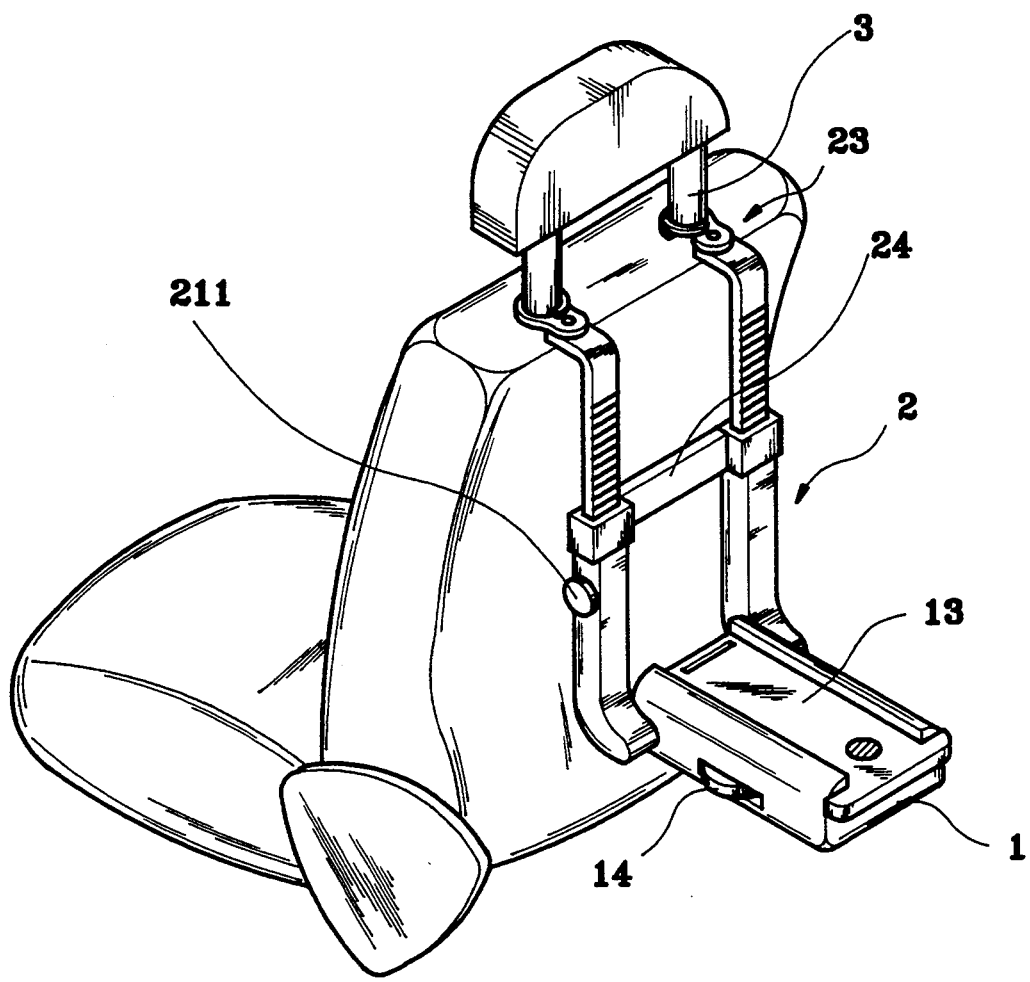
FIG. 3 is an installed view according to the present invention, showing the foldaway table mounted on a car seat and disposed at the back.

Referring to FIG. 3, by means of the two swivel hooks 23 on the retractable bars 22, the foldaway table can be conveniently mounted on the two supports 3 of the head rest of a car seat and disposed at the back, and the elevation of the table 1 can be adjusted by means of the control of the lock screws 211 on the tubes 21.

Figure 4:
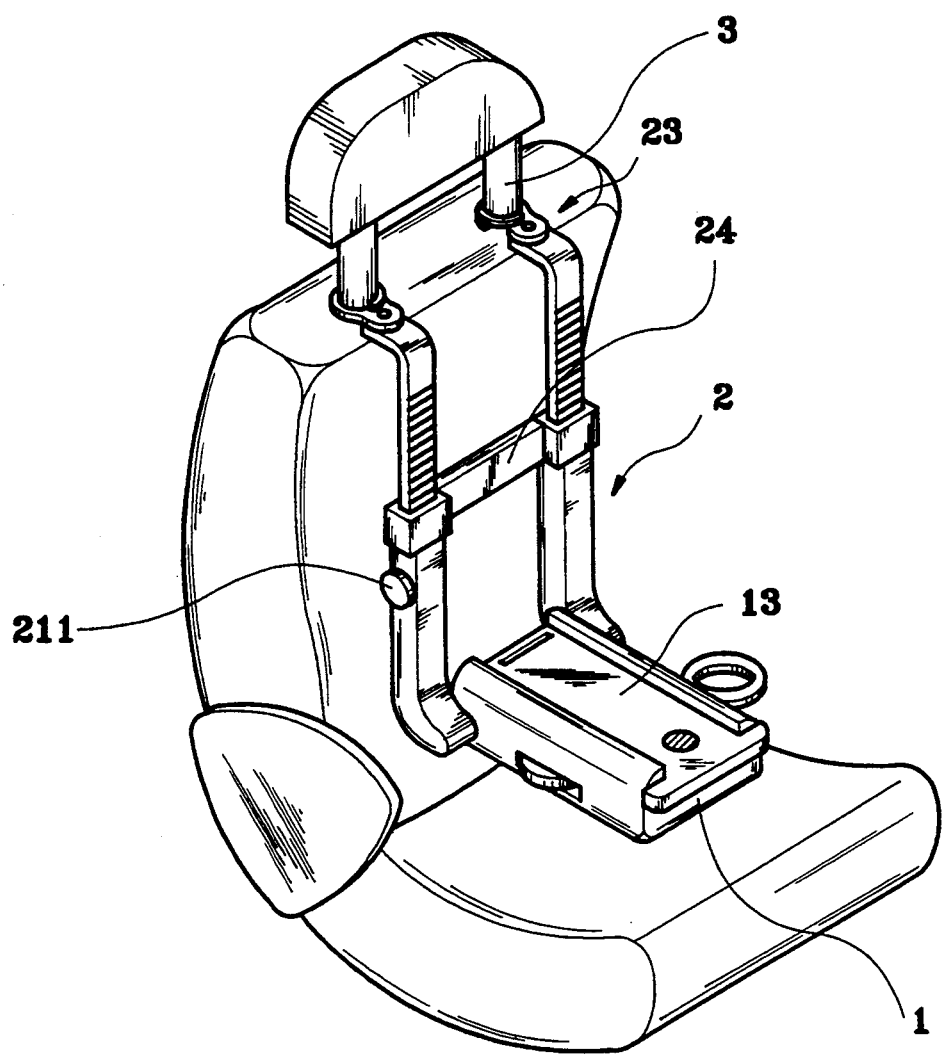
FIG. 4 is another installed view according to the present invention, showing the foldaway table mounted on a car seat and disposed at the front.

Referring to FIG. 4, the foldaway table can also be mounted on the supports 3 of the head rest and disposed at the front of the car seat.

Figure 5:
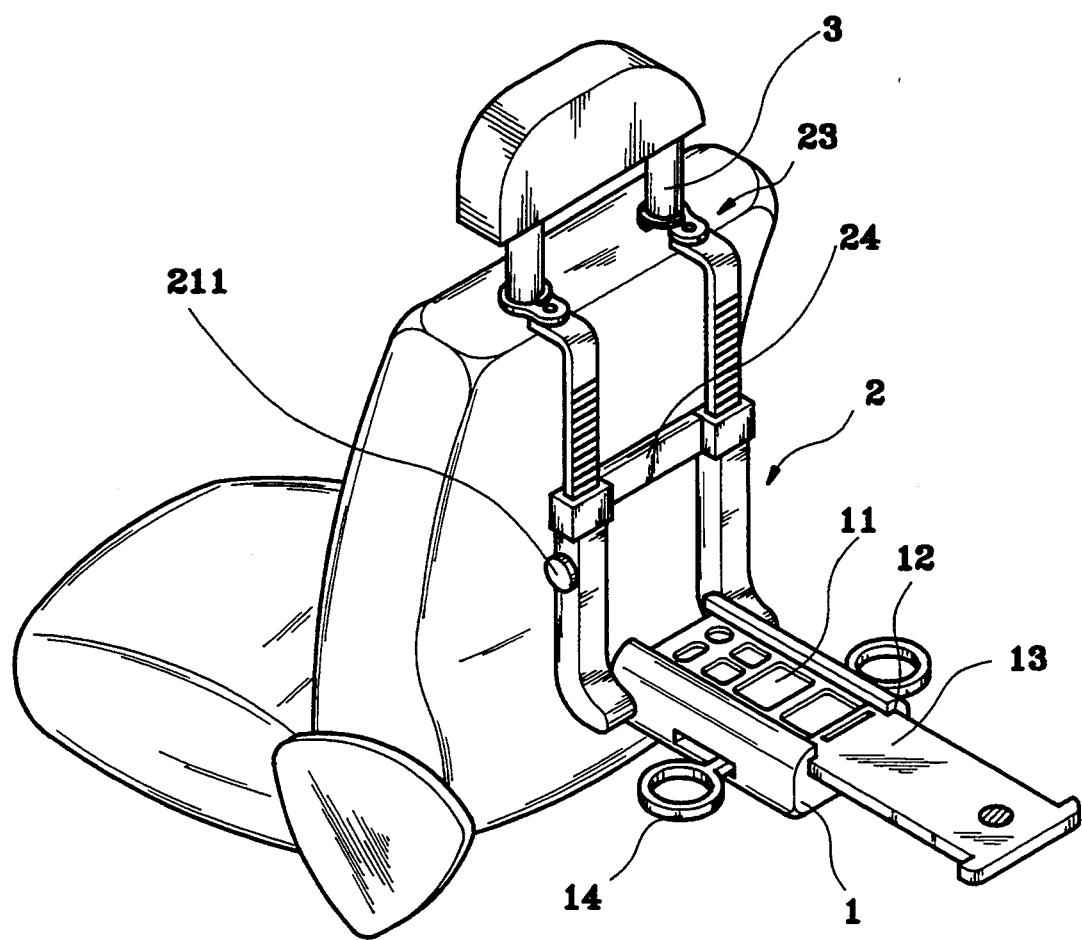
FIG. 5 is similar to FIG. 3 but showing the sliding cover and the cup holders extended out.

Referring to FIG. 5, when installed, the sliding cover 13 can be opened (or removed from the table 1 so that things can be placed in the recessed compartments 11. The cup holders 14 can also be pulled out of the table 1 for holding drinking cups, canned beverage, etc.

Figure 6:
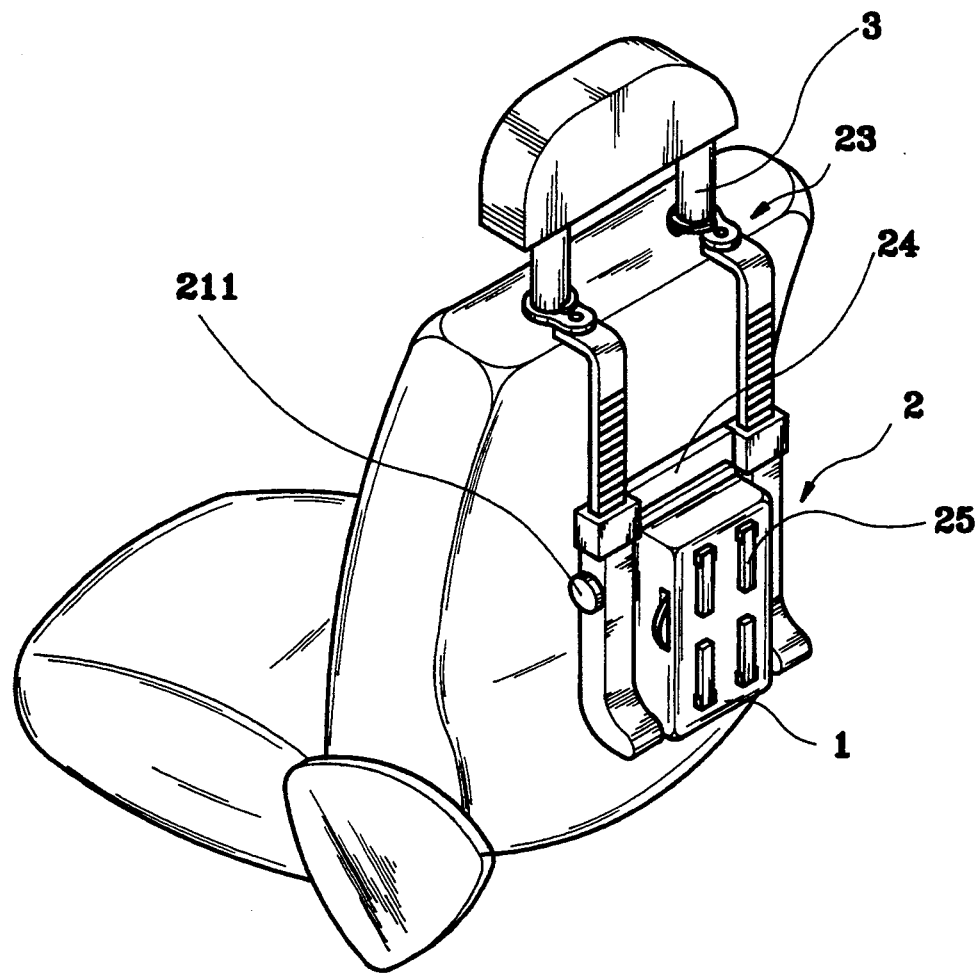
FIG. 6 is similar to FIG. 3 but showing the table collapsed.

Referring to FIG. 6, the table 1 may be turned upwards and retained in the collapsed position in between the link 24 and the tubes 21.

Figure 7:
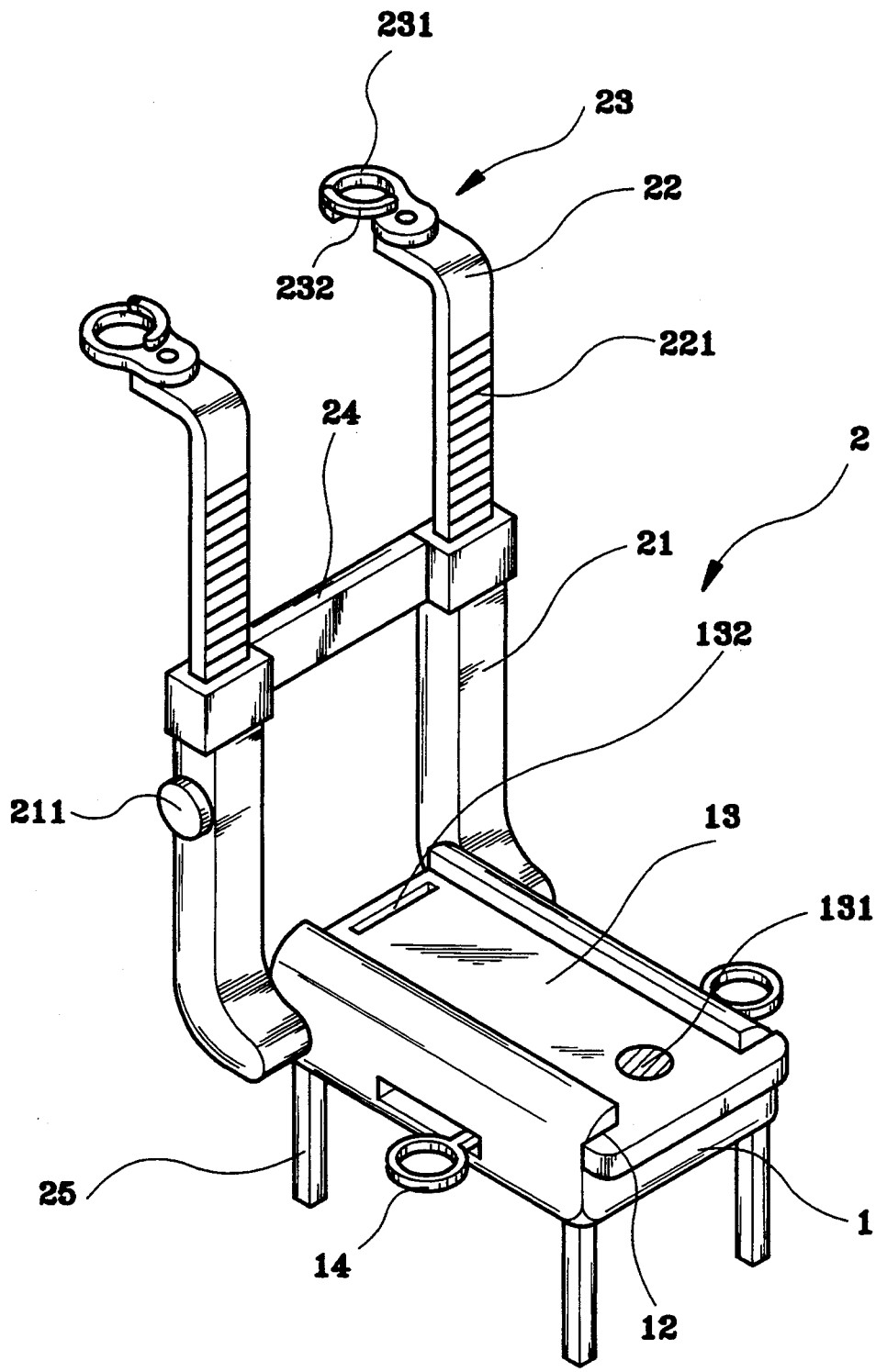
FIG. 7 is similar to FIG. 2 but showing the cup holders and the legs extended out.

Referring to FIG. 7, the legs 25 are extended out for supporting the foldaway table on the ground so that the foldaway table can be used as a small picnic table or an outdoor chair.

Figure 8:
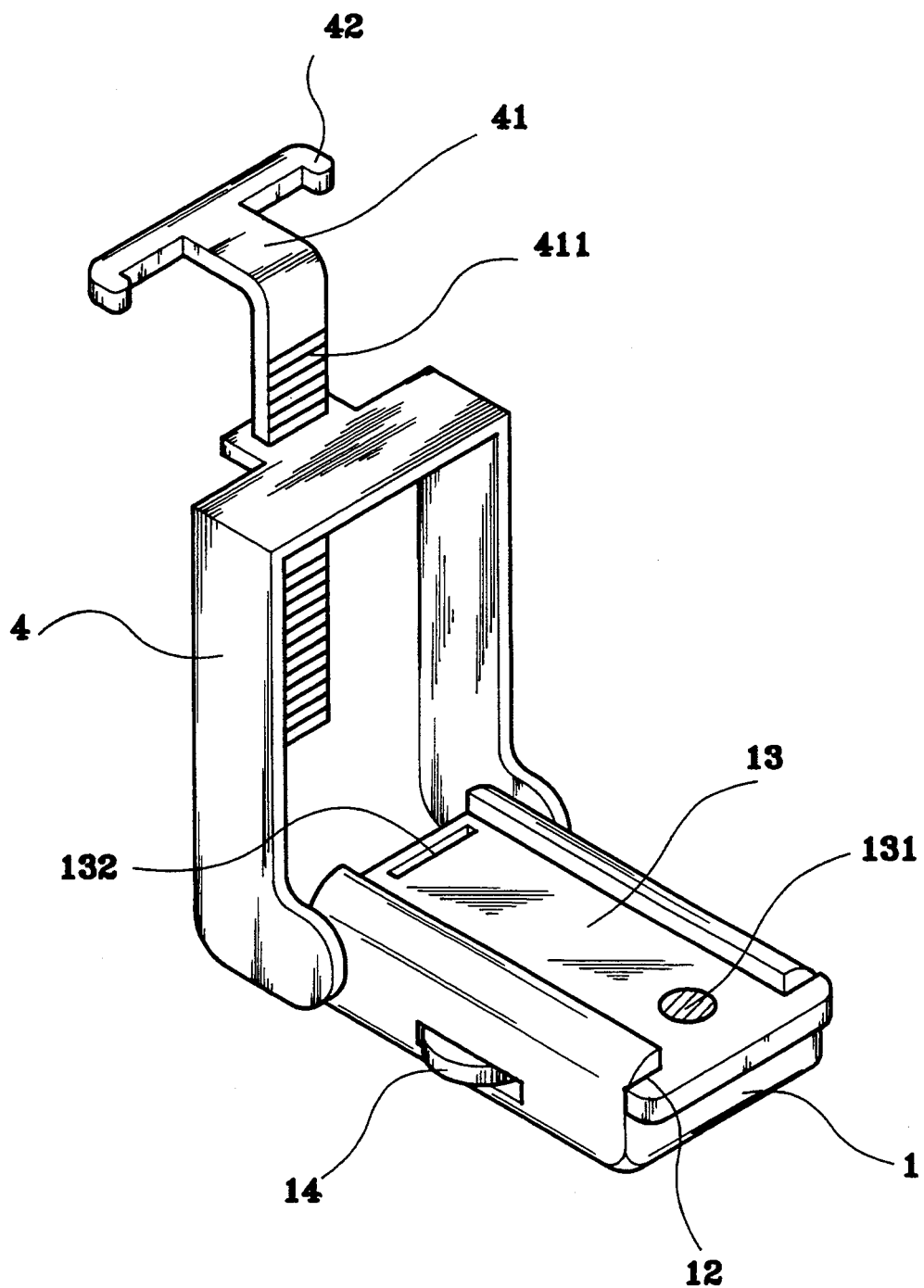

Referring to FIG. 8, therein illustrated is an alternate form of the foldaway table. The foldaway table according to this alternate form is also comprised of a table and a retractable mounting device. Because the structure of the table is identical to the table of the aforesaid first embodiment of the present invention, the same reference number is used. The retractable mounting device according to this alternate form comprises a frame 4 pivotably connected to the table 1 at one one, and a retractable mounting bar 41 fastened retractably fastened to the frame 4. The retractable mounting bar 41 has an elongated toothed body 411 retractably retained in a hole (not shown) on the frame 4, and a hanger 42 at one end of the elongated toothed body 411. By means of the hanger 42, the foldaway table can be conveniently mounted on the supports of the head rest of a car seat.

I claim:

1. A foldaway table comprising a table for carrying things, and a retractable mounting device for mounting said table on a car seat and for adjusting the elevation of said table relative to said car seat, said table comprising a plurality of recessed compartments at the top for holding things, a sliding cover covered over said recessed compartments, and collapsible stands at the bottom, wherein said retractable mounting device comprises at least one frame pivotably connected to said table at one end, at least one retractable bar respectively and retractably connected to said at least one frame, fastening means for fastening said at least one retractable bar to a car seat, and lock means for locking said at least one retractable bar to said at least one frame.

2. The foldaway table according to claim 1 wherein said stable comprises two retractable cup holders horizontally disposed on two opposite sides thereof.

3. The foldaway table according to claim 1 wherein said sliding cover comprises at least one embossed portion for moving with the fingers.

4. The foldaway table according to claim 1 wherein said lock means comprises at least one lock screw respectively threaded into a respective screw hole on either of said at least one frame to respectively lock said at least one retractable bar to said at least one frame at a desired elevation.

5. The foldaway table according to claim 1 wherein said at least one frame comprises two tubular frames joined by a horizontal link to hold said at least one retractable bar; said at least one retractable bar comprises two retractable bars, each retractable bar having one end respectively and retractably fastened to either of said at least one frame and an opposite end coupled with a swivel hook for mounting.

6. The foldaway table according to claim 1 wherein said at least one retractable bar comprises one retractable bar having one end retractably fastened to said at least one frame and an opposite end terminated to a hanger for mounting on the head rest of a car seat.

* * * * *